United States Patent [19]

Teel et al.

[11] Patent Number: 4,961,174

[45] Date of Patent: Oct. 2, 1990

[54] HIGH DATA RATE CONTINUOUS WAVE TOWED SONAR

[75] Inventors: Willis A. Teel, Panama City; James T. Christoff, Lynn Haven, both of Fla.

[73] Assignee: The United States of America as represented by the Secretary of the Navy, Washington, D.C.

[21] Appl. No.: 795,671

[22] Filed: May 9, 1977

[51] Int. Cl.⁵ .............................................. G01S 15/08
[52] U.S. Cl. ...................................................... 367/97
[58] Field of Search .................. 340/3 D, 3 T, 3 FM, 340/3 C; 367/97, 106

[56] References Cited

U.S. PATENT DOCUMENTS 3,368,189 2/1968 Page ..................................... 367/102
3,921,122 11/1975 Christoff ............................... 367/11
4,041,442 8/1977 Marquardt ........................... 367/100

Primary Examiner—Thomas H. Tarcza
Assistant Examiner—Daniel T. Pihulic
Attorney, Agent, or Firm—Harvey David; John Becker; Sol Sheinbein

[57] ABSTRACT

A continuous wave, doppler sonar has an underwater towed portion including a projector disposed vertically displaced from a multi-element receiving array. Received CW signals are processed for spillover elimination and subjected to phase lock loop tracking filters for reverberation and target doppler prior to target signal detection, thresholding, multiplexing and transmission to the towing portion. The target signals are distributed as to azimuth, recirculated in a memory, and reiteratively displayed in PPI format, with periodic updating.

9 Claims, No Drawings

HIGH DATA RATE CONTINUOUS WAVE TOWED SONAR

FIELD OF THE INVENTION

This invention relates to sonar systems, and more particularly to an improved CW (continuous wave) doppler sonar for detecting and tracking a plurality of underwater targets, simultaneously.

DISCUSSION OF THE PRIOR ART

Present active sonars used to detect and track underwater targets or objects, such as submarines, generally employ the classic ping-and-listen technique which is characterized by an inherently low data rate (for example, 6 seconds between pings for a 5000 yard target range). Such low data rates require continuous monitoring of the sonar screen by the operator and result in a lower probability of detection than is desired.

These present sonars use multiple sensor arrays deployed from a towed body with a cable pair from each sensor element connected via the tow cable to the tow craft. Beamforming is accomplished on board the tow craft by use of multiple delay line processing of the echo signals. Bringing a pair of conductors up the tow cable for each sensor results in a large tow cable with the attendant disadvantages of increased cable drag and requirement of a larger cable handling winch. Nullification of doppler effects introduced by motion of the array, termed ODN (own doppler nullification), has been performed by using a signal derived from the tow craft log and a computer to correct for the azimuth of return signals. Tracking of a relatively moving, or doppler, target has been accomplished by sampling multiple doppler filters.

A substantial advance in doppler sonar systems is disclosed in a copending patent application, Ser. No. 609,453, filed Aug. 28, 1975, entitled "Double Phase Lock Loop Sonar," and assigned to the assignee hereof. While that system may be operated either as an active or passive sonar system, in an active mode it utilizes the pulsed CW emissions characteristic of the mentioned ping-and-listen technique. As such, it is limited in its data resolution rate.

It would be desirable to have a sonar system of the CW type that would permit a substantially continuous stream of incoming data, particularly in sonar systems dedicated to the detection of targets, such as submarines, which are seeking to escape detection.

Some early sonars did not use pulses or "pings" of the transmission frequency, but were of a continuous wave transmission type. These sonars are exemplified by U.S. Pat. No. 3,067,281 to C. W. LaPierre et al, wherein an insonifying CW beam is caused to sweep in azimuth and is followed in sweep by a directional hydrophone. The resulting echo signals, when displayed on a cathode ray tube provide a visual presentation of surrounding underwater objects. These CW sonars have had only limited capability of distinguishing between moving and stationary targets, and are also characterized by a low data rate because of the sweep times involved.

SUMMARY OF THE INVENTION

The present invention aims to overcome some or all of the disadvantages and shortcomings of prior art sonar systems for the detection and tracking of moving underwater targets such as submarines.

With the foregoing in mind, it is a principal object of the invention to provide an improved continuous wave doppler sonar system having a high data rate capability giving a high probability of target detection.

Another important object of the invention is the provision of a towed sonar capable of detecting and tracking a substantial number of targets, say twelve or more, simultaneously.

Yet another object is the provision of a towed sonar of the foregoing character wherein the towed array is compact, light in weight, requires few cable pairs in the tow cable, and can be readily deployed from and towed by any of a variety of high speed craft such as patrol boats, helicopters, or the like.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
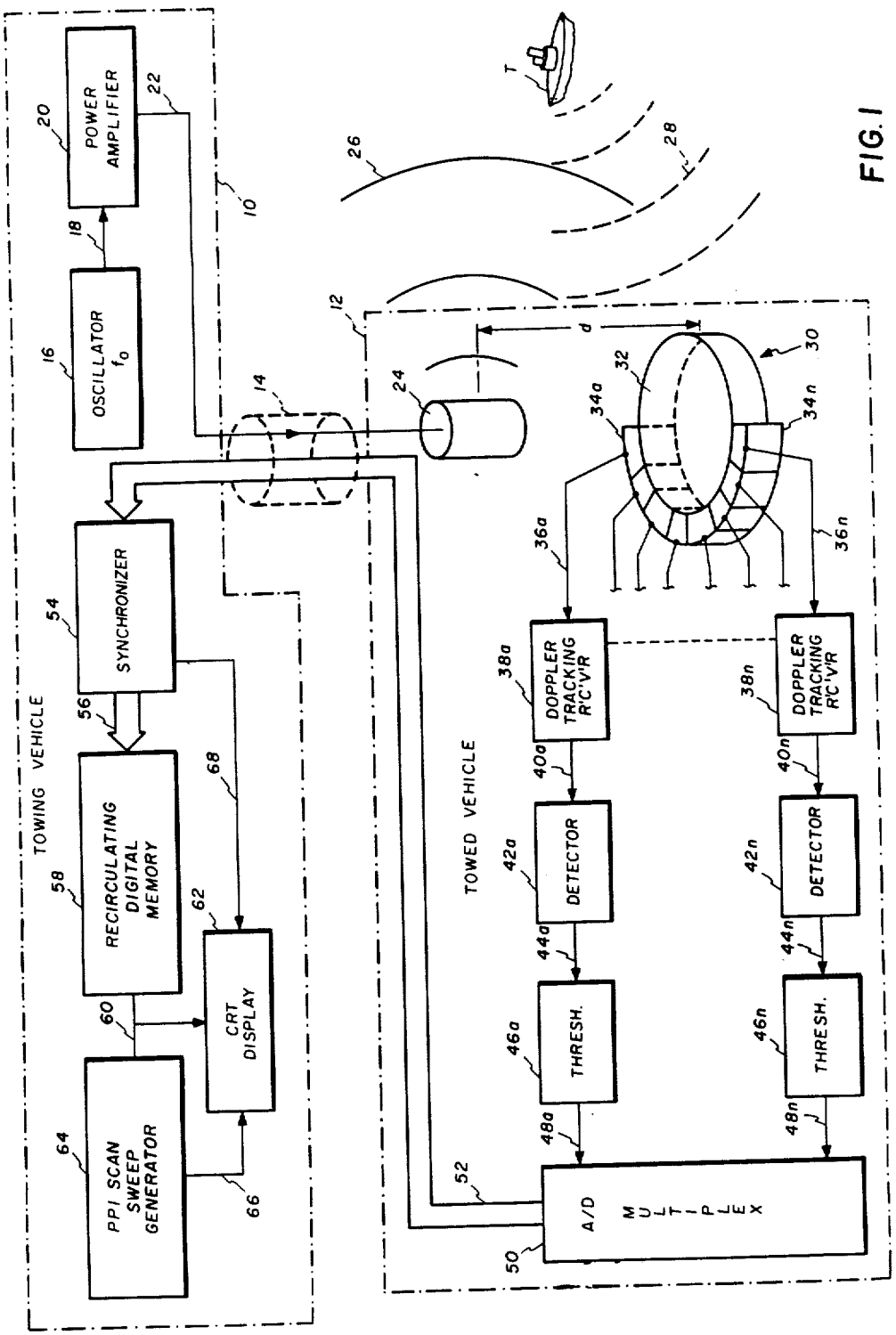
FIG. 1 is a diagrammatic illustration, largely in block form, of a high data rate, continuous wave, doppler sonar embodying the invention.

Referring to FIG. 1, a high data rate CW sonar embodying the invention will be described for use in conjunction with a towing vehicle 10 and a towed vehicle 12. The towing vehicle may be a surface vessel such as a patrol boat, or may be an aircraft such as a helicopter. The towed vehicle 12 is connected by suitable towing cable 14 to the towing vehicle, which cable includes such conductors as are necessary to carry signals between various elements in the towing and towed vehicles as will be later described in more detail.

Aboard the towing vehicle is carried an oscillator 16 that generate an electrical signal having an alternating component of a predetermined frequency $f_o$. The output of the oscillator 16 is applied, as shown by line 18, to a power amplifier 20. The amplifier 20 provides an amplified electrical signal of frequency $f_o$, as shown by line 22, through cable 14, to a wide angle electroacoustic transducer or projector 24 that is carried by the towed vehicle 12. The configuration of the projector is chosen to yield a desired vertical beam pattern, for example 20°, and a horizontal or azimuthal beam pattern of for example 120° to 360°. The projector 24 emits a CW acoustic signal 26 of frequency $f_o$ into the ambient water medium. At this point it should be understood that the term "acoustic," as used herein, is not limited to audible frequency ranges.

Objects or "targets" such as a submarine T reflect acoustic energy as acoustic echo signals 28 toward a receiving array, generally indicated at 30, and carried by the towed vehicle 12. Also, reflected back to the array 30 are reverberation signals in the form of a continuous stream of acoustic energy from medium discontinuities.

The array 30 comprises an acoustic lens 32 and a plurality of electroacoustic transducer elements $34a$–$34n$, each arranged around the lens 32 to respond to echoes in a predetermined azimuthal sector. The projector 24 and the receiving array 30 are vertically separated by a distance d, sufficient to avoid substantial interference or cross-talk from the projector directly to the receiving array. Thus, the projector is preferably deployed at a distance d of about 10 yards above the receiving array 30, so that at least 100 db of acoustic isolation is obtained. This vertical displacement, plus towing the towed elements of the sonar below the thermal layer (usually some 400 feet in depth) reduces the reverberation for deep water situations (2000 feet or greater) to a level where doppler targets of submarine size may be detected to ranges of 5000 yards, and smaller targets to proportionately shorter ranges. These echo signals are characterized by doppler resulting from movement of the target.

The plurality of array elements 34a–34n are connected, as shown by lines 36a–36n to a like plurality of doppler tracking receivers 38a–38n, respectively. The doppler tracking receivers will be described more fully hereinafter with reference to FIGS. 2 and 3. Suffice it to say for now that the receivers comprise circuitry for cancelling the transmitted frequency $f_o$, and double phase lock loops to separate and track each of the doppler shifted target echo signals, and the reverberation return.

The target signal outputs of the receivers 38a–38n are fed via lines 40a–40n to amplitude detectors 42a–42n of conventional construction. The detected signal outputs of the amplitude detectors 42a–42n are applied, as shown by lines 44a–44n as inputs to threshold circuits 46a–46n, also of conventional construction. The threshold circuits compare the incoming amplitude detected signals with a predetermined reference signal and pass only those signals corresponding in strength to targets of at least a predetermined minimum size.

The target echo signals passed by the threshold circuits are fed in parallel via lines 48a–48n to an analog to digital multiplexer 50. Multiplexer 50 samples and converts the target echo signals to digital target data represented by the broad flow line 52, which can be transmitted via a single pair of conductors forming part of cable 14. The multiplexed digital data, along with a suitable sync signal, is transmitted to a demultiplexer or synchronizer 54 which serves as a decoding switch to distribute the detected signals, as shown by line 56, to the proper azimuth bins in a recirculating memory 58.

The purpose of the recirculating memory 58 is to permit display of target data at a repetition rate that will substantially eliminate flicker, even though updating of data occurs less frequently. The recirculating memory 58 may conveniently utilize the principles and constructions described in U.S. Pat. No. 3,921,122 of James T. Christoff, wherein digital data is recirculated between updates, in a plurality of parallel serial-in serial-out shift registers and is read out in analog form as video information at the required repetition rate for flicker free presentation. Thus, the output 60 of recirculating memory 58 is supplied as target representing analog video signals, depicted by line 60 to a CRT (cathode ray tube) display 62. The display 62 is supplied with PP1 (plan position indicator) scan sweep signals by a PP1 scan sweep generator 64, as shown by line 66. The scan sweep rate is timed relative to the multiplexer/synchronizer functions by a sync signal, line 68, so that the display will provide target bearing information in PP1 format.

Considering that the system of this invention can track one or more targets simultaneously from each of the multiple preformed beams (typically 12 to 36 ten degree beams are formed), the value of the system in detecting the presence of submarine targets will be appreciated.

While a CW doppler sonar can provide excellent doppler resolution and a continuous input of target information, a heretofore limiting disadvantage has been the leakage or spillover of the transmit frequency into the receiver. The receiver about to be described substantially eliminates the spillover problem.

Figure 2:
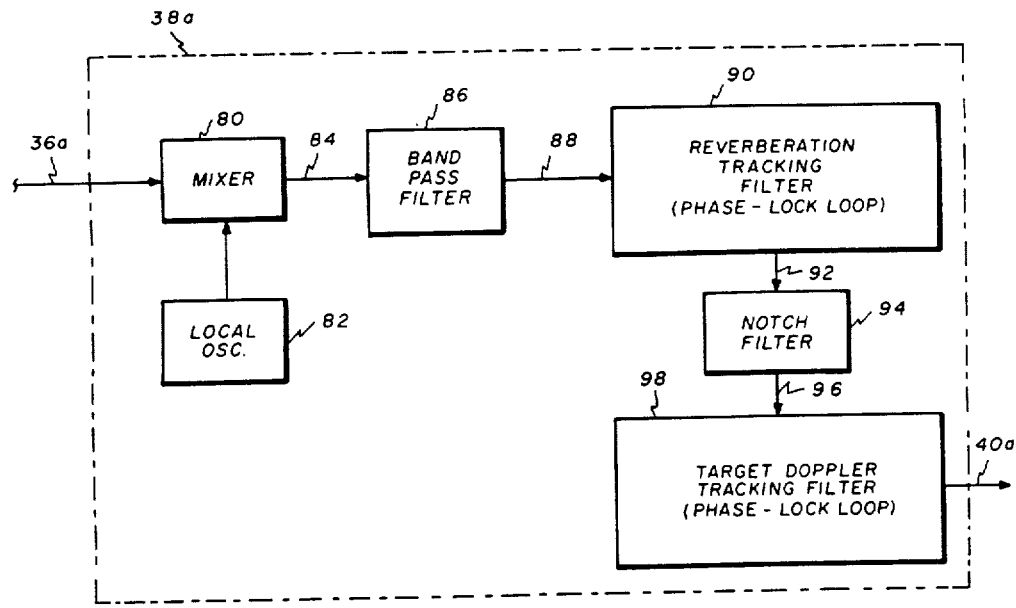
FIG. 2 is a diagrammatic illustration, in block form, of the doppler tracking receiver portion of the system of FIG. 1.

Referring now to FIG. 2, receiver 38a will be described as being representative of receivers 38a–38n. The input signal, line 36a, is applied to a frequency mixer 80 for mixing with the transmit frequency $f_o$ supplied by a local oscillator 82. The spillover component of the input on line 36a is thereby reduced to a dc (direct current) component in the resulting output on line 84. This dc component is readily suppressed with a multipole high pass filter 86 without attenuating the very lowest doppler shifted signal.

The output 88 of filter 86 is applied to a reverberation tracking filter 90 that removes the doppler effect introduced by movement of the sonar system. Thus, filter 90 performs the ODN (own doppler nullification) function.

The filtered output 92 of the reverberation tracking filter 90 is fed to a notch filter 94 and then as shown by line 96 to a target doppler tracking filter 98.

The filters 90 and 98 are conveniently of the phase-lock loop type and construction described in the copending patent application, Ser. No. 609,453, filed Aug. 28, 1975 by Willis A. Teel and James T. Christoff and assigned to the assignee hereof. Thus, filters 90 and 98 of this invention correspond to filters 27 and 33 of that application.

The output 40a of filter 98 carries the target echo signal and is applied, as mentioned earlier, to the amplitude detector 42a and subsequent elements for processing.

While the receiver of FIG. 2 eliminates the spillover problem through the combination of elements 80, 82 and 86, the process has two inherent disadvantages. First, the signal to noise ratio is reduced by 3 db; and second, the method folds the spectrum and creates up-down doppler ambiguities. However, the simplicity of the system renders it an attractive approach when considering that the invention makes possible the simultaneous searching of many bearings to greatly increase the information or data rate provided by the sonar. The doppler ambiguity and loss in signal to noise ratio can be avoided, at the cost of increased complexity, by using quadrature detection which doubles the number of receiver channels required.

Figure 3:
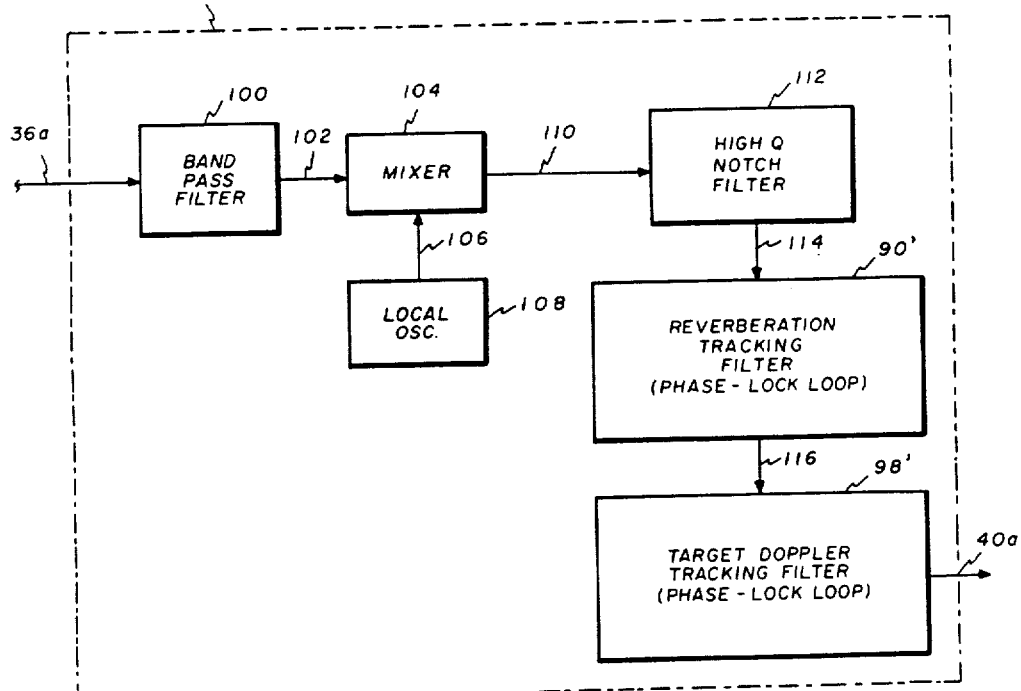
FIG. 3 is a diagrammatic illustration of an alternative receiver embodiment.

Referring now to FIG. 3, another construction for reducing or eliminating the spillover problem is embodied in a doppler tracking receiver 38a′. In this embodiment, the incoming signal, line 36a, is applied first to a band pass filter 100. The output 102 of filter 100 is applied to a mixer 104 for mixing with the output $f_o$, line 106, of a local oscillator 108. The output 110 of the mixer is applied to a high Q notch filter 112, having its output 114 fed to a reverberation tracking filter 90′. The latter has its output 116 fed to a target doppler tracking filter 98′ which provides the output, line 40a, for amplitude detection and further processing as before. The High Q notch filter is the spillover eliminating element in this embodiment, the effectiveness of which is enhanced by the mixing of the incoming signal with the local oscillator signal to reduce the frequency fed to the notch filter to a lower frequency for which the Q of the notch filter need not be as high as it would without the prior mixing.

From the foregoing description, it will be appreciated that the present invention, while utilizing some of the principles of the referenced patent and copending application, provides certain advantages, particularly for long range sonar detection of targets such as submarines. These advantages include the ability to simultaneously detect, and track in bearing, a plurality of targets, say as many as twelve or more. Moreover, the continuous input and display of data on a CRT at flicker free rates, and the lack of need for an operator to use the classic, but attention demanding, ping and listen technique, because of the continuous flow of data, renders likely a higher probability of detection. Other advantages of the system over many towed systems are the reduction in size and weight of tow cable, the lack of need for directional steering of the insonifying projector, or of steerable a hydrophone or receiving array.

Obviously, other embodiments and modifications of the subject invention will readily come to the mind of one skilled in the art having the benefit of the teachings presented in the foregoing description and the drawing. It is, therefore, to be understood this this invention is not to be limited thereto and that said modifications and embodiments are intended to be included within the scope of the appended claims.

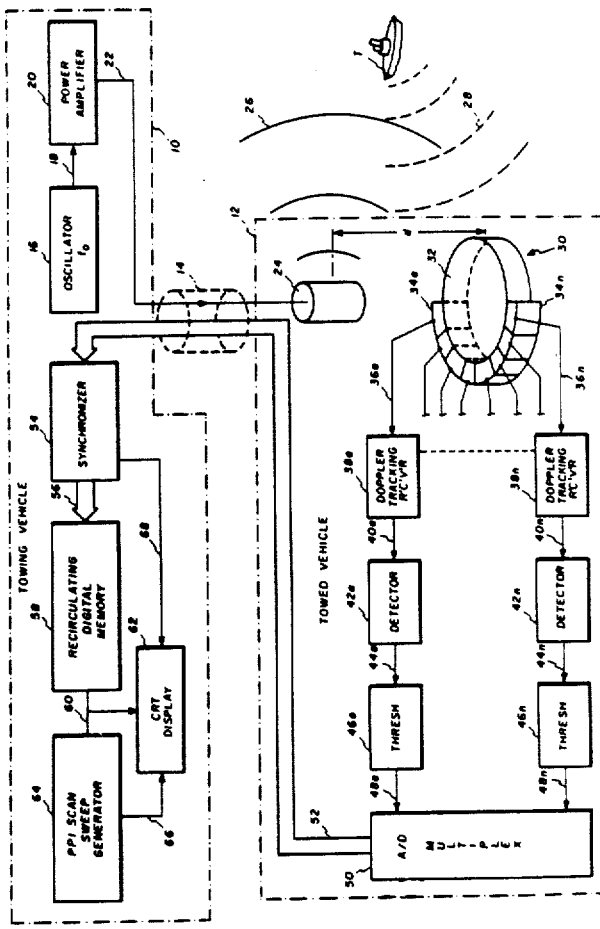

What is claimed is:

1. A sonar system comprising in combination:
   an acoustic projector for insonifying a water medium in a predetermined azimuthal zone about said projector with continuous wave acoustic energy of a predetermined frequency;
   oscillator means for driving said projector at said predetermined frequency;
   a receiving array disposed in a predetermined vertically spaced relation to said projector, said array being characterized by a multiplicity of electroacoustic elements, each responsive to acoustic energy arriving from a predetermined azimuth sector to generate corresponding electrical signals including reverberation signals and target echo signals;
   a multiplicity of parallel signal processing channels, each connected to one of said multiplicity of receiving elements and each of said channels comprising receiver means, amplitude detector means, and threshold means for selectively passing detected target signals;
   analog to digital multiplexer means for converting target signals from each of said channels into digital signals representative thereof;
   cable means, connected to said multiplexer means, for transmitting said digital signals;
   synchronizer means, connected to receive said digital signals, for effecting predetermined distribution of the digital signals corresponding to each of said channels and their respective azimuth sectors;
   recirculating digital memory means, connected to receive distribution of said digital signals, for providing reiterative readout thereof at a predetermined rate; and
   display means, coupled to said recirculating digital memory means, for providing a visual display of target echo data for each of said predetermined azimuth sectors;
   each of said receiver means comprising a reverberation tracking filter and a target doppler tracking filter, and further being characterized by the improvement comprising means for eliminating spillover of said predetermined frequency from said projector to said receiving array.

2. A sonar system as defined in claim 1, and wherein each of said reverberation tracking filters comprises a first phase-lock loop and each of said target doppler tracking filters comprises a second phase-lock loop connected in series with said first phase-lock loop.

3. A sonar system as defined in claim 2, and wherein said means for eliminating spillover comprises a frequency mixer having first and second inputs and an output, said first input being connected to receive said electrical signals from a corresponding one of said array elements, a local oscillator connected to provide said predetermined frequency to said second input of said mixer, and a band pass filter connected between said output of said mixer and the input of said reverberation tracking filter.

4. A sonar system as defined in claim 2, and wherein said means for eliminating spillover comprises a band pass filter connected to receive said electrical signals from a corresponding one of said array elements, a mixer having first and second inputs and an output, said first input being connected to the output of said band pass filter, a local oscillator connected to provide said predetermined frequency to said second input of said mixer, and a high Q notch filter connected between said output of said mixer and the input of said reverberation tracking filter.

5. A sonar system as defined in claim 3, and wherein said vertically spaced relation is characterized by sufficient vertical separation, between said projector and said array, to effect at least 100 db of acoustic isolation therebetween.

6. A sonar system as defined in claim 4, and wherein said vertically spaced relation is characterized by sufficient vertical separation, between said projector and said array, to effect at least 100 db of acoustic isolation therebetween.

7. A sonar system including a continuous wave acoustic signal projector adapted to insonify a predetermined zone thereabout, an array of acoustic transducer elements each responsive to target reflected acoustic echoes received from a predetermined segment of said zone, a plurality of echo receiver signal channels, and display means for indicating target containing segments, said system being characterized by the improvement comprising:
   said receiver channels each comprising mixer means, responsive to said echo signals and a local oscillator signal, for providing a d.c. target signal, filter means for rejecting spillover signals from said projector, first and second phase-lock loop means for nullifying doppler due to said movement of said array and for selectively passing said target echo signals, multiplexer means for combining echo signals passed by each of said receiver channels into a multiplex signal, synchronizer means for separating said echo signals from said multiplex signal, and memory means for storing said echo signals and providing repetitive readout thereof to said display means.

8. A sonar system as defined in claim 7, and further characterized by the improvement wherein:
said projector is vertically displaced from said array a distance sufficient to effect at least about 100 db of acoustic isolation therebetween.

9. A sonar system as defined in claim 8, and wherein:
said multiplexer means comprises means for effecting analog to digital conversion, and said memory means comprises a recirculating digital memory.

* * * * *

UNITED STATES PATENT AND TRADEMARK OFFICE
CERTIFICATE OF CORRECTION

PATENT NO. : 4961174

DATED : Oct. 2, 1990

INVENTOR(S) : Willis A. Teel, Et Al.

It is certified that error appears in the above-identified patent and that said Letters Patent is hereby corrected as shown below:

The title page should be deleted and substitute the attached title page, showing the illustrative figure and number of drawing sheets.

The 2 drawing sheets consisting of Fig. 1 and 2 should be added as shown on the attached pages.

Signed and Sealed this

Thirteenth Day of October, 1992

*Attest:*

DOUGLAS B. COMER

*Attesting Officer*     *Acting Commissioner of Patents and Trademarks*

United States Patent [19]

Teel et al.

[11] Patent Number: 4,961,174
[45] Date of Patent: Oct. 2, 1990

[54] HIGH DATA RATE CONTINUOUS WAVE TOWED SONAR

[75] Inventors: Willis A. Teel, Panama City; James T. Christoff, Lynn Haven, both of Fla.

[73] Assignee: The United States of America as represented by the Secretary of the Navy, Washington, D.C.

[21] Appl. No.: 795,671

[22] Filed: May 9, 1977

[51] Int. Cl.$^5$ .............................................. G01S 15/08
[52] U.S. Cl. ................................................. 367/97
[58] Field of Search ................... 340/3 D, 3 T, 3 FM, 340/3 C; 367/97, 106

[56] References Cited

U.S. PATENT DOCUMENTS 3,368,189  2/1968  Page ............................... 367/102
3,921,122  11/1975  Christoff ........................ 367/11
4,041,442  8/1977  Marquardt ....................... 367/100

Primary Examiner—Thomas H. Tarcza
Assistant Examiner—Daniel T. Pihulic
Attorney, Agent, or Firm—Harvey David; John Becker; Sol Sheinbein

[57] ABSTRACT

A continuous wave, doppler sonar has an underwater towed portion including a projector disposed vertically displaced from a multi-element receiving array. Received CW signals are processed for spillover elimination and subjected to phase lock loop tracking filters for reverberation and target doppler prior to target signal detection, thresholding, multiplexing and transmission to the towing portion. The target signals are distributed as to azimuth, recirculated in a memory, and reiteratively displayed in PPI format, with periodic updating.

9 Claims, 2 Drawings